United States Patent
Narang et al.

(10) Patent No.: US 8,078,174 B2
(45) Date of Patent: Dec. 13, 2011

(54) METHOD AND APPARATUS FOR IMPROVING MOBILE-TERMINATED CALL SET-UP PERFORMANCE

(75) Inventors: Mohit Narang, Escondido, CA (US); Amer Catovic, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 444 days.

(21) Appl. No.: 12/328,465

(22) Filed: Dec. 4, 2008

(65) Prior Publication Data

US 2010/0144352 A1 Jun. 10, 2010

(51) Int. Cl.
*H04W 88/02* (2009.01)
(52) U.S. Cl. ..................... 455/436; 455/415.1
(58) Field of Classification Search .................. 455/436, 455/415.1, 435.1, 445; 370/311
See application file for complete search history.

(56) References Cited

U.S. PATENT DOCUMENTS

| | | | | |
|---|---|---|---|---|
| 7,181,218 | B2* | 2/2007 | Ovesjo et al. ................. | 455/436 |
| 7,466,683 | B2 | 12/2008 | Bassompierre et al. | |
| 7,480,519 | B2* | 1/2009 | Jeong et al. .................... | 455/525 |
| 2005/0073977 | A1 | 4/2005 | Vanghi et al. | |
| 2006/0040655 | A1 | 2/2006 | Kim | |
| 2008/0268845 | A1* | 10/2008 | Wu et al. ....................... | 455/436 |

FOREIGN PATENT DOCUMENTS

| | | |
|---|---|---|
| WO | WO2008040448 A1 | 4/2008 |
| WO | WO2008155739 | 12/2008 |
| WO | WO2010002986 | 1/2010 |

OTHER PUBLICATIONS

International Search Report & Written Opinion—PCT/US2009/066885, International Search Authority—European Patent Office—Apr. 15, 2010.
3rd Generation Partnership Project; "Technical Specification Group Radio Access Network; Evolved Universal Terrestrial Radio Access (E-UTRA) Radio Resource Control (RRC); Protocol specification" 3GPP TS 36.331 V8.6.0 (Release 8) (Jun. 2009).
3rd Generation Partnership Project; "Technical Specification Group Radio Access Network; Evolved Universal Terrestrial Radio Access (E-UTRA); Requirements for support of radio resource management" 3GPP TS 36.133 V9.0.0 (Release 9), pp. 1-259 (May 2009).
3rd Generation Partnership Project; "Technical Specification Group Radio Access Network; Requirements for support of radio resource management (FDD)" 3GPP TS 25.133 V9.0.0 (Release 9), pp. 1-225 (May 2009).
ETSI TS 125 331 Universal Mobile Telecommunications System (UMTS); Radio Resource Control (RRC); Protocol specification, 3GPP TS 25.331 version 8.7.0 Release 8, Jul. 2009.

\* cited by examiner

*Primary Examiner* — Diane Mizrahi
(74) *Attorney, Agent, or Firm* — Abdollah Katbab (57) ABSTRACT

An apparatus and method for improving mobile-terminated call set-up performance comprising triggering an inter-radio access technology (IRAT) transition from a source cell to a target cell, remembering the deterministic timing of a plurality of paging occasions in the source cell, and using the deterministic timing for checking at least one paging channel in the source cell during transition to the target cell and before starting to monitor at least one paging channel in the target cell.

60 Claims, 5 Drawing Sheets

METHOD AND APPARATUS FOR IMPROVING MOBILE-TERMINATED CALL SET-UP PERFORMANCE

FIELD

This disclosure relates generally to apparatus and methods for mobile terminated call set-up performance. More particularly, the disclosure relates to improving mobile-terminated call set-up performance during transition between wireless systems.

BACKGROUND

Mobile user equipments (UEs) typically transition from one wireless system to another wireless system depending on their mobility and the availability of coverage by the wireless systems. For example, transitions can occur between second generation (2G) and third generation (3G) wireless systems, between long term evolution (LTE) and 3G wireless systems or between LTE and Global System for Mobile Communications (GSM) wireless systems. Taking one example, 2G wireless systems typically provide basic digital voice and low rate data services to user equipment (UE) over a broad coverage area. That is, the 2G wireless systems typically have ubiquitous coverage. Broad coverage area is implemented using a plurality of cells, each with an access node (e.g. base station) to provide a wireless access connection between a UE, which is mobile within the coverage area, and the wireless communication system. The wireless access connection may employ space division multiple access (SDMA), frequency division multiple access (FDMA), time division multiple access (TDMA), code division multiple access (CDMA) and/or orthogonal frequency division multiple access (OFDMA) to allow a plurality of UEs to access the wireless communication system. In one example, the 2G wireless system is based on Global System for Mobile Communications (GSM)/General Packet Radio Service (GPRS)/Enhanced Data Rates for GSM Evolution (EDGE) while the 3G wireless system is based on wideband code division multiple access (WCDMA).

Many wireless communications systems are upgrading their infrastructure to provide enhanced communication services, such as high rate data services and Internet protocol (IP) packet transport services to mobile UEs. These enhanced communication services are typically provided by 3G wireless systems. In many cases, the 3G wireless systems are implemented only in portions of the broad coverage area provided by 2G wireless systems. That is, in many cases 3G wireless systems do not provide ubiquitous coverage. 3G coverage areas are typically situated in high density population areas, such as the centers of urban areas, airports, shopping centers, business parks, etc. In this case, 3G coverage areas appear as islands of coverage within the broader 2G coverage areas. This diversity of coverage areas introduces the necessity of transitioning the wireless access connection of the mobile UE between the 2G coverage area and 3G coverage area. Although the example of transitioning between the 2G coverage area and 3G coverage area is discussed here, the UE may transition between any coverage areas of any radio access technologies employed by any wireless systems, including but not limited to, UMTS (universal mobile telecommunication system), WCDMA (wideband code division multiple access), GSM (Global System for Mobile communications), GSM/GPRS (General Packet Radio Service/EDGE (Enhanced Data Rates for GSM Evolution), LTE (long term evolution), IS-95 (interim standard 95), CDMA2000, EVDO (evolution data optimized) or UMB (ultra mobile broadband), etc.

SUMMARY

Disclosed is an apparatus and method for improving call set-up performance during transition between wireless networks. According to one aspect, a method for improving mobile-terminated call set-up performance comprising triggering an inter-radio access technology (IRAT) transition from a source cell to a target cell; remembering the deterministic timing of a plurality of paging occasions in the source cell; and using the deterministic timing for checking at least one paging channel in the source cell during transition to the target cell and before starting to monitor at least one paging channel in the target cell.

According to another aspect, a user equipment comprising a processor and a memory, the memory containing program code executable by the processor for performing the following: triggering an inter-radio access technology (IRAT) transition from a source cell to a target cell; remembering the deterministic timing of a plurality of paging occasions in the source cell; and using the deterministic timing for checking at least one paging channel in the source cell during transition to the target cell and before starting to monitor at least one paging channel in the target cell.

According to another aspect, a wireless device for improving mobile-terminated call set-up performance comprising means for triggering an inter-radio access technology (IRAT) transition from a source cell to a target cell; means for remembering the deterministic timing of a plurality of paging occasions in the source cell; and means for using the deterministic timing for checking at least one paging channel in the source cell during transition to the target cell and before starting to monitor at least one paging channel in the target cell.

According to yet another aspect, a computer program product, comprising a computer-readable medium including program codes stored thereon, comprising program codes for causing a computer to trigger an inter-radio access technology (IRAT) transition from a source cell to a target cell; program codes for causing the computer to remember the deterministic timing of a plurality of paging occasions in the source cell; and program codes for causing the computer to use the deterministic timing for checking at least one paging channel in the source cell during transition to the target cell and before starting to monitor at least one paging channel in the target cell.

Advantages of the present disclosure include reducing or avoiding missing paging occasions while transitioning from one wireless system to another wireless system, and thus, improving user experience and improving mobile-terminated call setup success rate.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
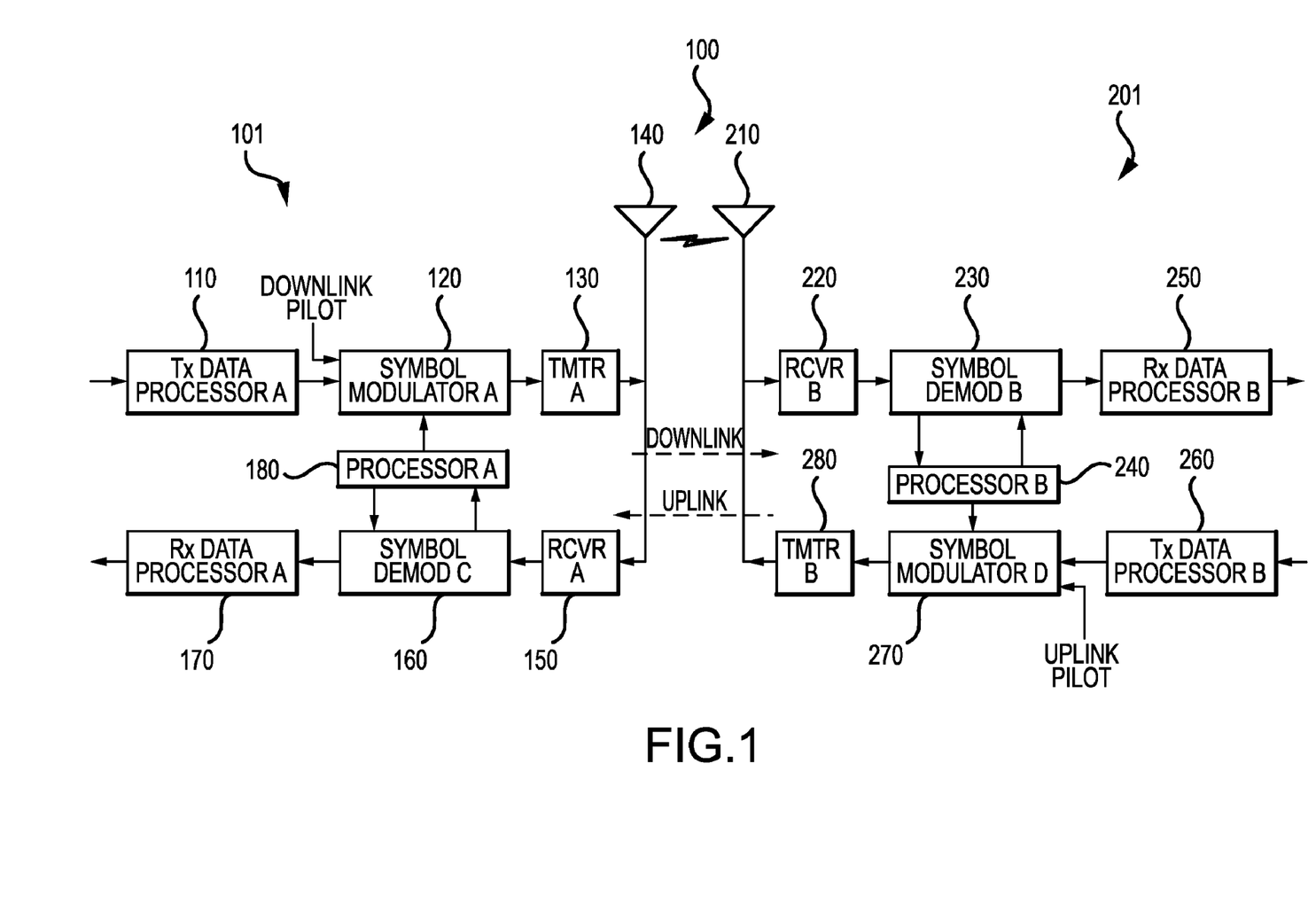
FIG. 1 is a block diagram illustrating an example wireless system.

FIG. 1 is a block diagram illustrating an example access node/UE system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node 101 (a.k.a. base station) and a user equipment or UE 201 (a.k.a. wireless communication device). In the downlink leg, the access node 101 (a.k.a. base station) includes a transmit (TX) data processor A 110 that accepts, formats, codes, interleaves and modulates (or symbol maps) traffic data and provides modulation symbols (a.k.a. data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (a.k.a. data symbols) outputted from the receiver unit B 220. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (a.k.a. base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., FDMA, OFDMA, CDMA, TDMA, SDMA, etc.), multiple terminals transmit concurrently on the uplink leg. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
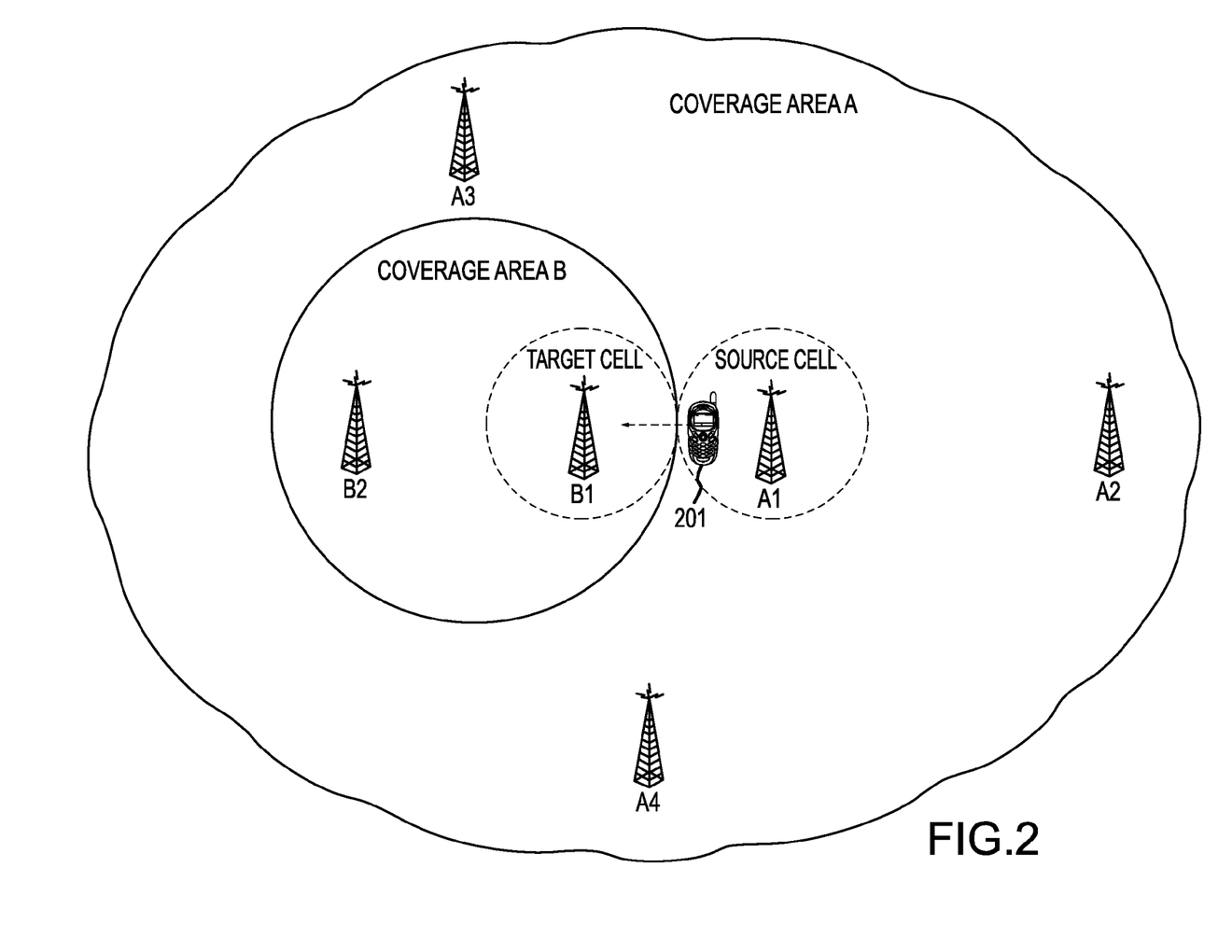
FIG. 2 shows an example of the user equipment (UE) within one coverage area A with access nodes $A_1, A_2, A_3, A_4$ and approaching the edge of another coverage area B with access nodes $B_1$ and $B_2$.

FIG. 2 shows an example of the UE 201 within one coverage area A with access nodes $A_1, A_2, A_3, A_4$ and approaching the edge of another coverage area B with access nodes $B_1$ and $B_2$. As shown in FIG. 2, UE 201 is located within the source cell within coverage area A and approaching the target cell within coverage area B. Coverage area A employs radio access technology A while coverage area B employs radio access technology B. Wireless system A is associated with coverage area A, and wireless system B is associated with coverage area B. In one aspect, as the UE 201 approaches the target cell, a comparison is made to determine if the signal quality from the target cell (a.k.a. target cell signal quality) is higher than the signal quality from the source cell (a.k.a. source cell signal quality). If the signal quality from the target cell is higher, than a transition is made from the source cell to the target cell, i.e., an inter-radio access technology (IRAT) transition is triggered from the source cell to the target cell. In one aspect, the signal quality from the target cell must be higher than the signal quality from the source cell for a continuous X time interval before the transition is made. In one example, the X time interval is 5 seconds.

Transitioning the wireless access connection of the UE 201 between wireless systems A and B requires a finite amount of time to complete. For example, if UE 201 starts in the source cell within coverage area A (e.g., a 2G coverage area employing 2G radio access technology by a 2G wireless system) and moves towards the target cell within coverage area B (e.g., a 3G coverage area employing 3G radio access technology by a 3G wireless system), the UE 201 may reselect to wireless system B (e.g., 3G wireless system) and start collecting system information from the access nodes within coverage area B. This process may not be completed for some time, e.g., several seconds such as 3-5 seconds for some systems. Meanwhile, wireless system A (e.g., 2G wireless system) may be sending a page to the UE 201 via the access node $A_1$ within the source cell within the coverage area A (e.g., the 2G coverage area). If the UE 201 is collecting system information in wireless system B (e.g., 3G wireless system), it does not monitor the incoming page sent to wireless system A (e.g., 2G wireless system), resulting in an unsuccessful page and a poor experience for the UE user. The UE 201 does not start to monitor the paging channel in the target cell within coverage area B until the UE 201 has completed collecting all the essential system information from the target cell and until the UE 201 has performed mobility information update on the target cell and its associated radio access technology (RAT). In one aspect, the paging cycle is either 1.28 or 2.56 seconds which means that during this paging cycle of either 1.28 or 2.56 seconds, pages are missed by the UE 201. One skilled in the art would understand that the scope and spirit of the present disclosure are not affected by other examples of radio access technologies employed by other wireless systems, including but not limited to, UMTS, WCDMA, GSM, GSM/GPRS/EDGE, LTE, IS-95, CDMA2000, EVDO or UMB, etc.

Figure 3:
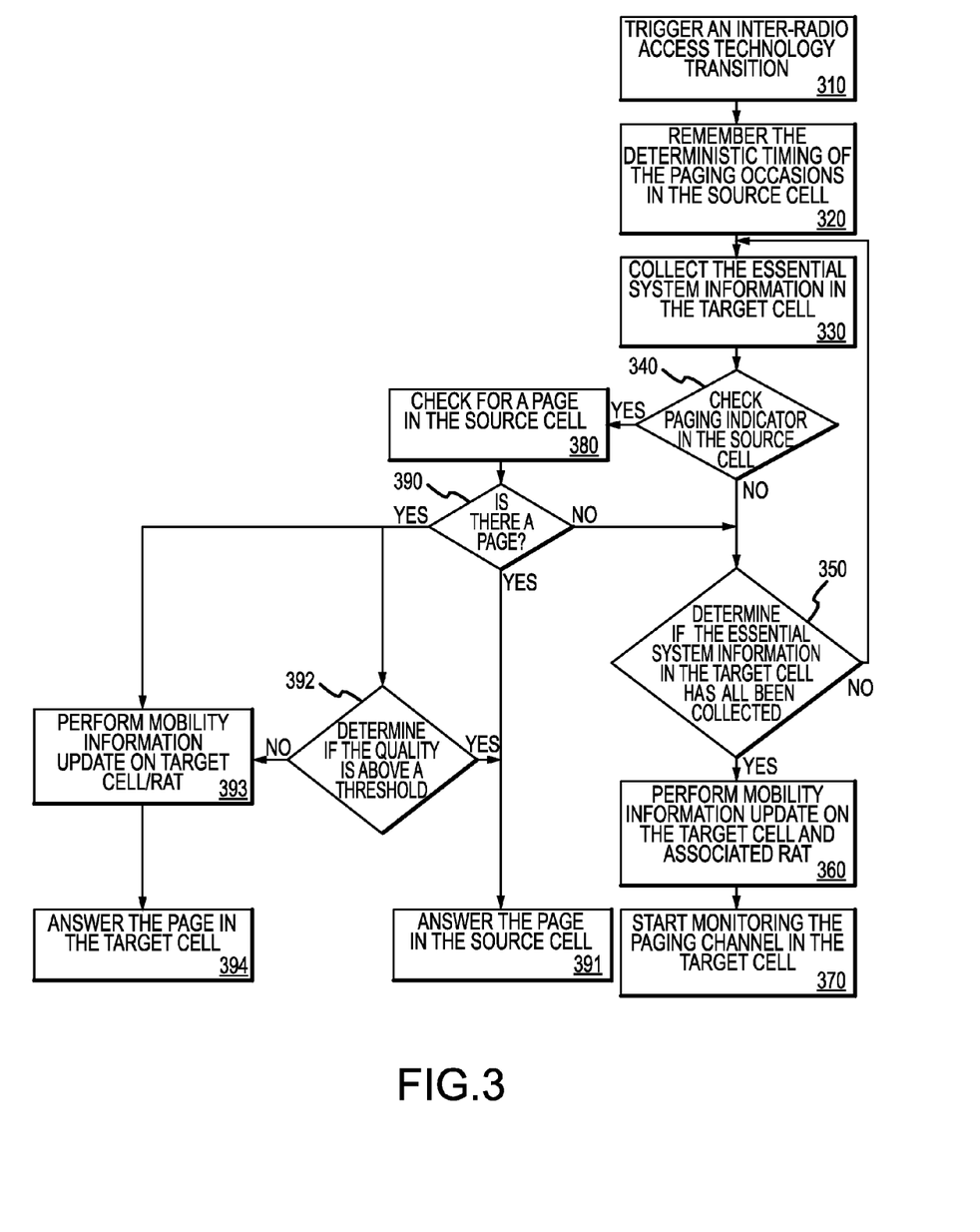
FIG. 3 shows an example flow diagram for improving mobile-terminated call set-up performance during transition between wireless systems.

FIG. 3 shows an example flow diagram for improving mobile-terminated call set-up performance during transition between wireless systems, including monitoring the paging channel on one wireless system while transitioning to another wireless system. The example flow diagram shown in FIG. 3 will reduce or avoid missing paging occasions during the transition. In block 310, an inter-radio access technology (IRAT) transition is triggered. The UE 201 is moving out of the source cell (shown in FIG. 2) to within the target cell (shown in FIG. 2). In this example, the source cell is part of wireless system A's coverage area A which employs radio access technology A. The target cell is part of wireless system B's coverage area B which employs radio access technology B. The inter-radio access technology (IRAT) transition is triggered during the cell reselection (CR), i.e., moving out of the source cell which employs radio access technology A to the target cell which employs radio access technology B. During IRAT transition, the deterministic timing of the paging occasions in the source cell is remembered in block 320. By remembering the deterministic timing of the paging occasions in the source cell, the UE facilitates the monitoring of the paging occasions in the source cell during IRAT reselection by accounting for the periodicity of the paging occasions of the UE 201 in the source cell.

In block 330, the essential system information in the target cell is collected to permit successful operation within the target cell. One skilled in the art would understand that what is considered essential system information may be based on the system, application, operator choice, design constraints or combinations thereof. In block 340, the timing of paging occasions of the UE 201 in the source cells is continued to be tracked (i.e., check for paging indicator in the source cell). At the time of the paging occasion of the UE 201 in the source cell, the UE 201 re-acquires the source cell and checks for the presence of the page within at least one paging channel for the UE 201 in the source cell in order to reduce or avoid missing pages for the UE 201 that are still being sent to the source cell. In one aspect, the operations in blocks 330 and 340 are operating simultaneously. In another aspect, the checking for the presence of the page in the source cell has the priority with respect to the collection of the system information in the target cell. If there is no page for the UE 201 in the source cell, then proceed to block.

In block 350, determine if the essential system information in the target cell has all been collected. If the essential system information in the target cell has not all been collected, proceed back to block 330 to continue collecting the system information. One skilled in the art would understand that essential system information are parameters that may be determined based on the system, application, operator choice, design constraints or combinations thereof. If the essential system information has all been collected, proceed to block 360 to perform a mobility information update on the target cell which could include for example at least one or more of the following: Location Area update in GSM, GPRS, UMTS or LTE; Routing Area update in GPRS, UMTS or LTE; UTRAN Routing Area in UMTS; or Tracking Area in LTE. Following block 360, proceed to block 370 to start monitoring the paging channel in the target cell. In one aspect, there's a plurality of paging channels in the target cell.

In block 340, if there is at least one paging indicator for the UE 210 indicating the possibility of the page for the UE 210 in the source cell, then proceed to block 380 to check for a page in the source cell. In block 390, determine if there is or is not a page. In one aspect, the operations in blocks 380 and 390 are combined as one. In another aspect, the operations in blocks 340, 380 and 390 are combined as one. If there is no page, proceed to block 350. If there is a page, one of three options may be exercised. In a first option shown in block 391, answer the page in the source cell. In a second option shown in block 392, determine if the quality of the source cell is above a threshold. If the quality of the source cell is above the threshold, then proceed to block 391 to answer the page. If the quality of the source cell is not above the threshold, proceed to a third option starting in block 393. In block 393, perform a mobility information update on the target cell which could include for example at least one or more of the following: Location Area update in GSM, GPRS, UMTS or LTE; Routing Area update in GPRS, UMTS or LTE; UTRAN Routing Area in UMTS; or Tracking Area in LTE. Following block 393, proceed to block 394 to answer the page in the target cell. One skilled in the art would recognize that the three options presented here are examples and that other options may be added or that any of the three options may be excluded without affecting the spirit and scope of the present disclosure. In one aspect, examples of the threshold are received signal level, received signal-to-noise ratio, received interference power, total received power, path loss, bit error rate, frame error rate or packet loss rate, etc. One skilled in the art would understand that the threshold parameter and value can be chosen based on the system, application, operator choice, design constraints or combinations thereof without affecting the scope and spirit of the present disclosure. Additionally, one skilled in the art would understand that many examples of radio access technologies employed by various wireless systems, including but not limited to, UMTS, WCDMA, GSM, GSM/GPRS/EDGE, LTE, IS-95, CDMA2000, EVDO or UMB, etc. are applicable to the example shown in FIG. 3 without affecting the scope and spirit of the present disclosure.

One skilled in the art would understand that the flow diagrams, logical blocks and/or modules described herein may be implemented by various ways such as in hardware, firmware, software or a combination thereof For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof With software, the implementation may be through modules (e.g., procedures, functions, etc.) that perform the functions described therein. The software codes may be stored in memory units and executed by a processor unit. Additionally, the various illustrative flow diagrams, logical blocks and/or modules described herein may also be coded as computer-readable instructions carried on any computer-readable medium or computer program product known in the art.

Figure 4:
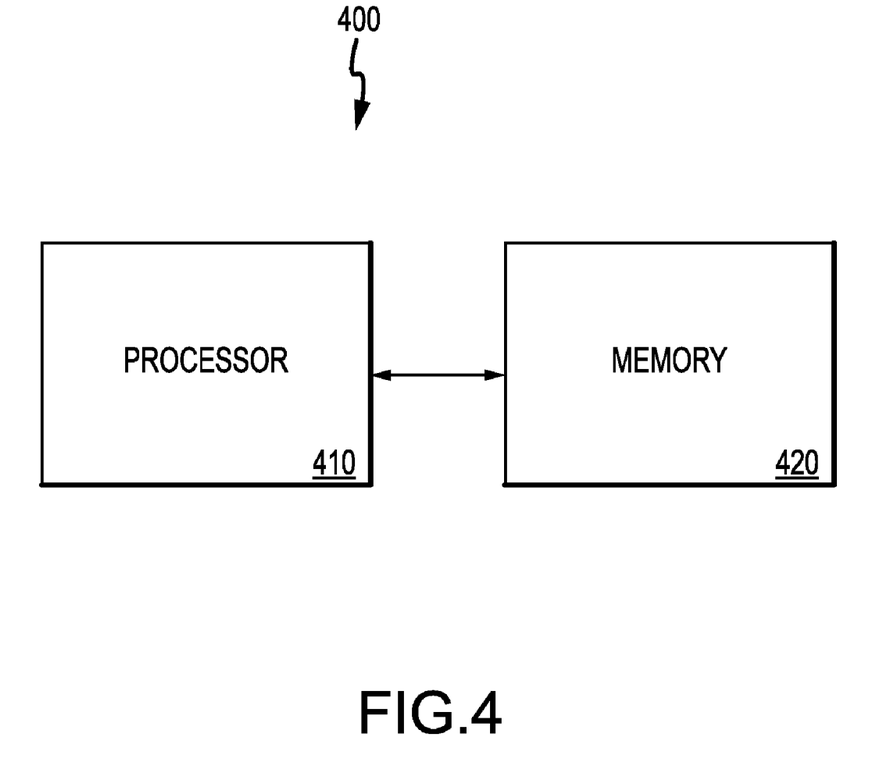
FIG. 4 shows an example of a device comprising a processor in communication with a memory for executing the processes for improving mobile-terminated call set-up performance during transition between wireless systems.

In one example, the illustrative flow diagrams, logical blocks and/or modules described herein is implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 4 shows an example of a device 400 comprising a processor 410 in communication with a memory 420 for executing the processes for improving mobile-terminated call set-up performance during transition between wireless systems. In one example, the device 400 is used to implement the algorithm illustrated in FIG. 3. In one aspect, the memory 420 is located within the processor 410. In another aspect, the memory 420 is external to the processor 410.

Figure 5:
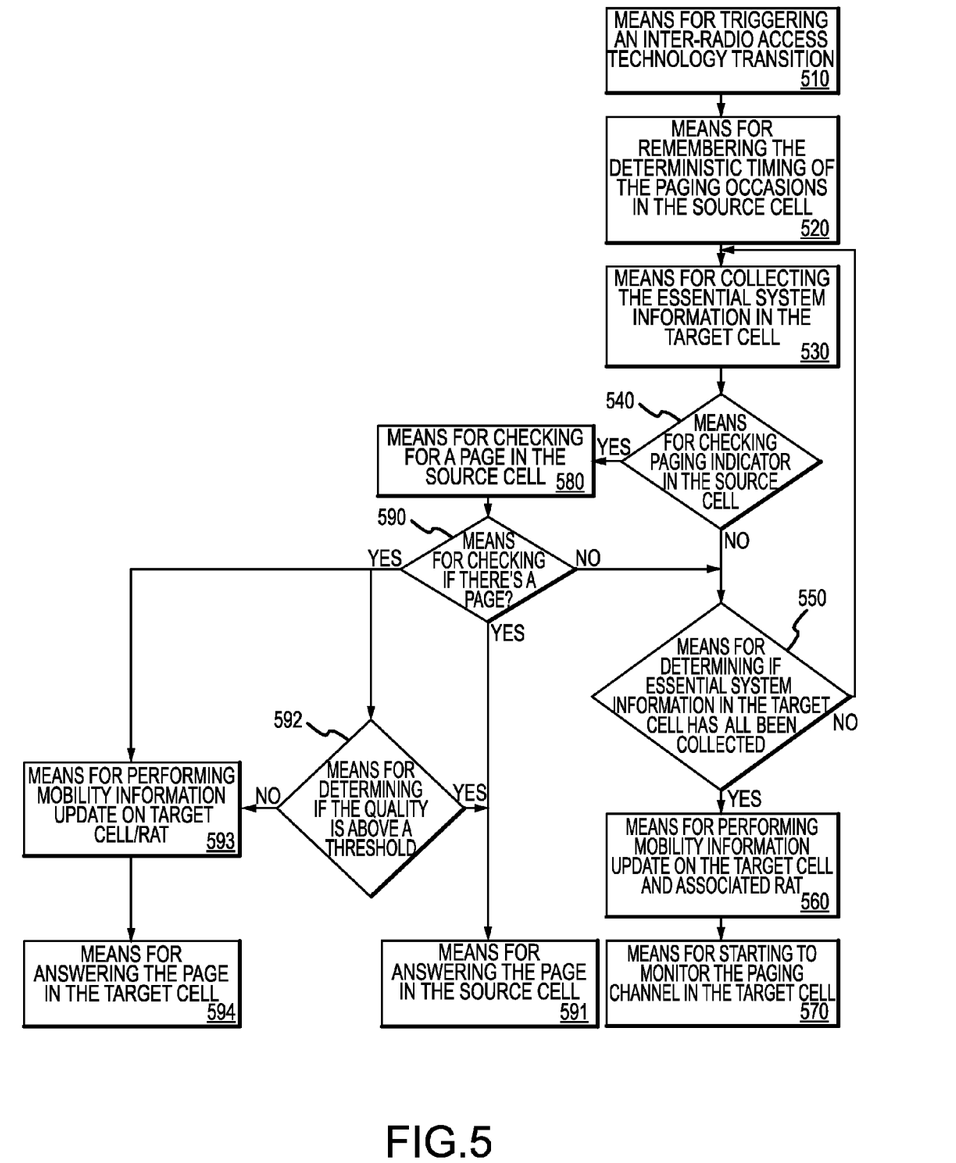
FIG. 5 shows an example of a device suitable for improving mobile-terminated call set-up performance during transition between wireless systems.

FIG. 5 shows an example of a device 500 suitable for improving mobile-terminated call set-up performance during transition between wireless systems. In one aspect, the device 500 is implemented by at least one processor comprising one or more modules configured to provide different aspects of improving call set-up performance during transition between wireless systems as described herein in blocks 510, 520, 530, 540, 550, 560, 570, 580, 590, 591, 592, 593 and 594. For example, each module comprises hardware, firmware, software, or any combination thereof. In one aspect, the device 500 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for improving mobile-terminated call set-up performance comprising:
   triggering an inter-radio access technology (IRAT) transition from a source cell to a target cell;
   storing, in a memory of an electronic device, information regarding scheduled times of a plurality of paging occasions in the source cell; and
   checking, at the scheduled times, at least one paging channel in the source cell during transition to the target cell and before starting to monitor at least one paging channel in the target cell.

2. The method of claim 1 further comprising collecting system information of the target cell to allow successful inter-radio access technology transition.

3. The method of claim 2 further comprising determining that the system information of the target cell has been collected.

4. The method of claim 3 further comprising performing a mobility information update on the target cell including one or more of Location Area update in GSM, GPRS, UMTS or LTE; Routing Area update in GPRS, UMTS or LTE; UTRAN Routing Area in UMTS; or Tracking Area in LTE when it has been determined that the system information of the target cell has been collected.

5. The method of claim 4 further comprising starting to monitor the at least one paging channel in the target cell.

6. The method of claim 1 further comprising checking for a page in the source cell at the schedules times.

7. The method of claim 6 further comprising answering the page in the source cell.

8. The method of claim 6 further comprising determining that the quality of the source cell is above a threshold.

9. The method of claim 8 further comprising answering the page in the source cell when it has been determined that the quality of the source cell is above the threshold.

10. The method of claim 8 further comprising performing a mobility information update on the target cell when it has been determined that the quality of the source cell is not above the threshold.

11. The method of claim 10 further comprising answering the page in the target cell.

12. The method of claim 8 wherein the threshold is a value of one of the following: a received signal level, a received signal-to-noise ratio, a received interference power, a total received power, a path loss, a bit error rate, a frame error rate or a packet loss rate.

13. The method of claim 1 further comprising comparing a target cell signal quality with a source cell signal quality to determine triggering the inter-radio access technology (IRAT) transition.

14. The method of claim 13 wherein the target cell signal quality is higher than the source cell signal quality.

15. The method of claim 14 wherein the target cell signal quality is higher than the source cell signal quality for a continuous time interval of at least 5 seconds.

16. The method of claim 1 wherein the source cell is within a 2G coverage area and the target cell is within a 3G coverage area.

17. A user equipment comprising a processor and a memory, the memory containing program code executable by the processor for performing the following:
  triggering an inter-radio access technology (IRAT) transition from a source cell to a target cell;
  storing information regarding scheduled times of a plurality of paging occasions in the source cell; and
  checking, at the scheduled times, at least one paging channel in the source cell during transition to the target cell and before starting to monitor at least one paging channel in the target cell.

18. The user equipment of claim 17 wherein the memory further comprising program code for collecting system information of the target cell to allow successful inter-radio access technology transition.

19. The user equipment of claim 18 wherein the memory further comprising program code for determining that the system information of the target cell has been collected.

20. The user equipment of claim 19 wherein the memory further comprising program code for performing a mobility information update on the target including one or more of Location Area update in GSM, GPRS, UMTS or LTE; Routing Area update in GPRS, UMTS or LTE; UTRAN Routing Area in UMTS; or Tracking Area in LTE when it has been determined that the system information of the target cell has been collected.

21. The user equipment of claim 20 wherein the memory further comprising program code for starting to monitor the at least one paging channel in the target cell.

22. The user equipment of claim 17 wherein the memory further comprising program code for checking for a page in the source cell at the scheduled times.

23. The user equipment of claim 22 wherein the memory further comprising program code for answering the page in the source cell.

24. The user equipment of claim 22 wherein the memory further comprising program code for determining that the quality of the source cell is above a threshold.

25. The user equipment of claim 24 wherein the memory further comprising program code for answering the page in the source cell when it has been determined that the quality of the source cell is above the threshold.

26. The user equipment of claim 24 wherein the memory further comprising program code for performing a mobility information update on the target cell when it has been determined that the quality of the source cell is not above the threshold.

27. The user equipment of claim 26 wherein the memory further comprising program code for answering the page in the target cell.

28. The user equipment of claim 24 wherein the threshold is a value of one of the following: a received signal level, a received signal-to-noise ratio, a received interference power, a total received power, a path loss, a bit error rate, a frame error rate or a packet loss rate.

29. The user equipment of claim 17 wherein the memory further comprising program code for comparing a target cell signal quality with a source cell signal quality to determine triggering the inter-radio access technology (IRAT) transition.

30. The user equipment of claim 17 wherein the source cell is within a 2G coverage area and the target cell is within a 3G coverage area.

31. The user equipment of claim 17 wherein the source cell is within a GSM coverage area and the target cell is within a LTE coverage area.

32. The user equipment of claim 17 wherein the source cell is within a GSM/GPRS/EDGE coverage area and the target cell is within a UMTS coverage area.

33. A wireless device for improving mobile-terminated call set-up performance comprising:
  means for triggering an inter-radio access technology (IRAT) transition from a source cell to a target cell;
  means for storing information regarding scheduled times of a plurality of paging occasions in the source cell; and
  means for checking, at the scheduled times, at least one paging channel in the source cell during transition to the target cell and before starting to monitor at least one paging channel in the target cell.

34. The wireless device of claim 33 further comprising means for collecting system information of the target cell to allow successful inter-radio access technology transition.

35. The wireless device of claim 34 further comprising means for determining that the system information of the target cell has been collected.

36. The wireless device of claim 35 further comprising means for performing a mobility information update on the target cell including one or more of Location Area update in GSM, GPRS, UMTS or LTE; Routing Area update in GPRS, UMTS or LTE; UTRAN Routing Area in UMTS; or Tracking Area in LTE when it has been determined that the system information of the target cell has been collected.

37. The wireless device of claim 36 further comprising means for starting to monitor the at least one paging channel in the target cell.

38. The wireless device of claim 33 further comprising means for checking for a page in the source cell at the scheduled times.

39. The wireless device of claim 38 further comprising means for answering the page in the source cell.

40. The wireless device of claim 38 further comprising means for determining that the quality of the source cell is above a threshold.

41. The wireless device of claim 40 further comprising means for answering the page in the source cell if when it has been determined that the quality of the source cell is above the threshold.

42. The wireless device of claim 40 further comprising means for performing a mobility information update on the target cell when it has been determined that the quality of the source cell is not above the threshold.

43. The wireless device of claim 42 further comprising means for answering the page in the target cell.

44. The wireless device of claim 40 wherein the threshold is a value of one of the following: a received signal level, a received signal-to-noise ratio, a received interference power, a total received power, a path loss, a bit error rate, a frame error rate or a packet loss rate.

45. The wireless device of claim 33 further comprising means for comparing a target cell signal quality with a source cell signal quality to determine triggering the inter-radio access technology (IRAT) transition.

46. The wireless device of claim 33 wherein the source cell is within a 2G coverage area and the target cell is within a 3G coverage area.

47. The wireless device of claim 33 wherein the source cell is within a GSM coverage area and the target cell is within a LTE coverage area.

48. The wireless device of claim 33 wherein the source cell is within a GSM/GPRS/EDGE coverage area and the target cell is within a UMTS coverage area.

49. A computer program product, comprising: a computer-readable medium including program codes stored thereon, comprising:
   program codes for causing a computer to trigger an inter-radio access technology (IRAT) transition from a source cell to a target cell;
   program codes for causing the computer to store information regarding scheduled times of a plurality of paging occasions in the source cell; and
   program codes for causing the computer to check, at the scheduled times, at least one paging channel in the source cell during transition to the target cell and before starting to monitor at least one paging channel in the target cell.

50. The computer program product of claim 49 further comprising program codes for causing the computer to collect system information of the target cell to allow successful inter-radio access technology transition.

51. The computer program product of claim 50 further comprising program codes for causing the computer to determine that the system information of the target cell has been collected.

52. The computer program product of claim 51 further comprising program codes for causing the computer to perform a mobility information update on the target cell including one or more of Location Area update in GSM, GPRS, UMTS or LTE; Routing Area update in GPRS, UMTS or LTE; UTRAN Routing Area in UMTS; or Tracking Area in LTE when it has been determined that the system information of the target cell has been collected.

53. The computer program product of claim 52 further comprising program codes for causing the computer to start to monitor the at least one paging channel in the target cell.

54. The computer program product of claim 49 further comprising program codes for causing the computer to check for a page in the source cell at the scheduled times.

55. The computer program product of claim 54 further comprising program codes for causing the computer to answer the page in the source cell.

56. The computer program product of claim 54 further comprising program codes for causing the computer to determine that the quality of the source cell is above a threshold.

57. The computer program product of claim 56 further comprising program codes for causing the computer to answer the page in the source cell when it has been determined that the quality of the source cell is above the threshold.

58. The computer program product of claim 56 further comprising program codes for causing the computer to perform a mobility information update on the target cell when it has been determined that the quality of the source cell is not above the threshold.

59. The computer program product of claim 58 further comprising program codes for causing the computer to answer the page in the target cell.

60. The computer program product of claim 49 further comprising program codes for causing the computer to compare a target cell signal quality with a source cell signal quality to determine triggering the inter-radio access technology (IRAT) transition.

* * * * *